United States Patent
Choi et al.

(10) Patent No.: US 7,903,612 B2
(45) Date of Patent: Mar. 8, 2011

(54) RECEIVED SIGNAL LEVEL COMPENSATION APPARATUS AND METHOD FOR MOBILE STATION

(75) Inventors: Yun Seo Choi, Goyang-si (KR); Jung Ran Lee, Gyeongsangbuk-do (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 799 days.

(21) Appl. No.: 11/900,280

(22) Filed: Sep. 10, 2007

(65) Prior Publication Data

US 2008/0112477 A1    May 15, 2008

(30) Foreign Application Priority Data

Nov. 15, 2006  (KR) .......................... 10-2006-0112515

(51) Int. Cl.
*H04J 3/07* (2006.01)

(52) U.S. Cl. ......................................... 370/332; 370/505
(58) Field of Classification Search .................. 370/310, 370/332, 333, 349; 455/522, 69
See application file for complete search history.

(56) References Cited

U.S. PATENT DOCUMENTS
6,374,085 B1 *  4/2002  Saints et al. ................... 455/69

FOREIGN PATENT DOCUMENTS
KR  2004-110889  12/2004

* cited by examiner

*Primary Examiner* — Brenda Pham
(74) *Attorney, Agent, or Firm* — Cha & Reiter, LLC

(57) ABSTRACT

An apparatus and method for compensating a received signal level transmitted from a mobile terminal to a network through a measurement report message are provided. A received signal level compensation method for a mobile station includes measuring a received signal level of a multiframe; detecting an error of the received signal level; compensating, if an error of the received signal level is detected, the received signal level; and transmitting the compensated received signal level to the network.

13 Claims, 2 Drawing Sheets

RECEIVED SIGNAL LEVEL COMPENSATION APPARATUS AND METHOD FOR MOBILE STATION

CLAIMS OF PRIORITY

This application claims priority to an application entitled "RECEIVED SIGNAL LEVEL COMPENSATION APPARATUS AND METHOD FOR MOBILE STATION," filed in the Korean Intellectual Property Office on Nov. 15, 2006 and assigned Serial No. 2006-0112515, the contents of which are incorporated herein by reference.

BACKGROUND OF THE INVENTION

1. Field of the Invention

The present invention relates to a mobile communication system and, in particular, to an apparatus and method for compensating a received signal level transmitted from a mobile terminal via a measurement report message.

2. Description of the Related Art

Typically, noise and interference are more significant problems in wireless communication systems than in hard-wired communication systems. Thus, various modulation, amplification, mixing, and filtering techniques have been employed for improving communication reliability in wireless systems.

In order to process wireless signals, a radio frequency (RF) module is employed in each wireless communication device. The RF unit is responsible for converting a baseband signal into a radio signal and amplifying the radio signal to be robust to interferences at its transmission side. The RF unit is also responsible for filtering, low-noise amplifying, and down-converting a desired signal to recover the transmitted signal.

Now days, mobile communication systems have been developed to support a packet data service in addition to the basic voice communication service. With the advance of the mobile communication system, the management of the system has become complex.

In order to efficiently manage the communications between a base station (BS) and mobile stations (MSs), each MS collects and reports channel status to the BS in the format of a measurement report.

The measurement report includes information such as a serving cell reception level (RXLEV-FULL(SUB)-SERVING-CELL), a serving cell reception quality (RXQUAL-FULL(SUB)-SERVING-CELL), a neighbor cell broadcast channel (BCCH-FREQ-NCELL), and a neighbor cell list (BASIC-NCELL, BASIC-NCELL, . . . ).

Accordingly, the BS checks the reception level (RXLEV) and reception quality (RXQUAL) at the mobile station and guides the MS having a low RXLEV and RXQUAL to perform a handover to an optimal BS with reference to the information on neighbor cells.

In the meantime, when more than two MSs are associated with a BS at an adjacent location at the same, transmission signals of the neighbor MSs can act as interferences in a receive (RX) band of a specific MS.

Typically, a transmission/reception (TX-RX) isolation in a front end module and RF transceiver of an MS is not perfect, such that the transmission power of a neighbor MS may be received. In this case, the neighbor transmission power leaks in the RX band of the neighbor MS, thus resulting in influence to a direct current (DC) signal of In Phase (I-Phase) signal components and Quadrature phase (Q-Phase) signal components (IQ).

In a case where a TX IQ timeslot of an interferer MS is overlapped with an RX IQ timeslot of the MS, the IQ signal can be influenced by the TX power, thereby resulting in an increase in DC offset of the RX IQ signals. This causes a reduction in reception quality of the RX signal.

The above effect occurs in a Direct Conversion Receiver (DCR) which does not use an intermediate frequency (IF). However, this interference may occur in Near-Zero Intermediate Frequency (NZIF) transceiver.

FIG. 1 is a block diagram illustrating a configuration of a conventional DCR.

Referring to FIG. 1, the DCR includes a low-noise amplifier (LNA) 10, a filter 20, a local oscillator 30, and a mixer 40.

In an MS employing the above-configured conventional DCR, if a TX signal of a neighbor MS acts as interference to RX signal of the MS, a current leakage occurs on a path of the local oscillator 30 such that signals input through a path 1 and a path 2 are mixed by the mixer 40. The mixture of the signals input through the paths 1 and 2 causes a DC offset. Such a problem is derived from a characteristic of the DCR of which local oscillator frequency should be equal to the received signal frequency.

Since the received signal level increases by the interference, the neighbor MS's TX signal and thus the measurement value reported to the network is considered good enough. As a result, the network determines that the channel between the MS and BS is good, thereby not transmitting a handover command although the channel state is actually bad. Particularly, the possibility of the TX spurious in RX band significantly increases in a weak transmit power area. In this case, since the transmit power of neighbor cell is also weak at the location of the MS, a serving cell maintains the operation with the MS, thus resulting in call drop.

SUMMARY OF THE INVENTION

The present invention has been made in an effort to solve the above problems and provides additional advantages, by providing a received signal level compensation apparatus and method for a mobile station that are capable of preventing transmit spurious from influencing received signals.

It is another aspect of the present invention to provide a received signal level compensation apparatus and method for a mobile station that are capable of compensating a received signal level of a measurement report message in accordance with detection of transmit spurious in a receive band.

It is another aspect of the present invention to provide a receive signal level compensation apparatus and method for a mobile station that are capable of improving a handover decision reliability by compensating received signal level.

It is yet another aspect of the present invention to provide a receive signal level compensation apparatus and method for a mobile station that are capable of effectively performing a handover by compensating transmit power value contained in a measurement report message when a received signal level of a multiframe is greater than a predetermined threshold value.

In accordance with an aspect of the present invention, a received signal level compensation method for a mobile communication system having a mobile station and network includes measuring a received signal level of a multiframe; detecting an error of the received signal level; compensating, if an error of the received signal level is detected, the received signal level; and transmitting the compensated received signal level to the network.

In accordance with another aspect of the present invention, a received signal level compensation method for a mobile station using a multiframe including a plurality of frames includes measuring a received signal level of a multiframe; calculating a received signal level of an idle frame and an average received signal level of non-idle frames, in the multiframe; determining the occurrence of an error on the basis of the received signal level of the idle frame and the average received signal level of the non-idle frames; compensating the received signal level of the frame by adding a predetermined offset to the received signal level; and generating a measurement report message containing the compensated received signal level to be transmitted to a network.

In accordance with another aspect of the present invention, a received signal level compensation apparatus of a mobile station includes a radio frequency unit for receiving signals in the form of a multiframe from a network; a control unit for measuring a received signal level of the multiframe, generating a threshold and an offset of a received signal level on the basis of the received signals, determining an error occurrence in the multiframe, and compensating the error using the offset; and a memory unit for storing the received signals and the threshold and offset of the received signal level.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Figure 1:
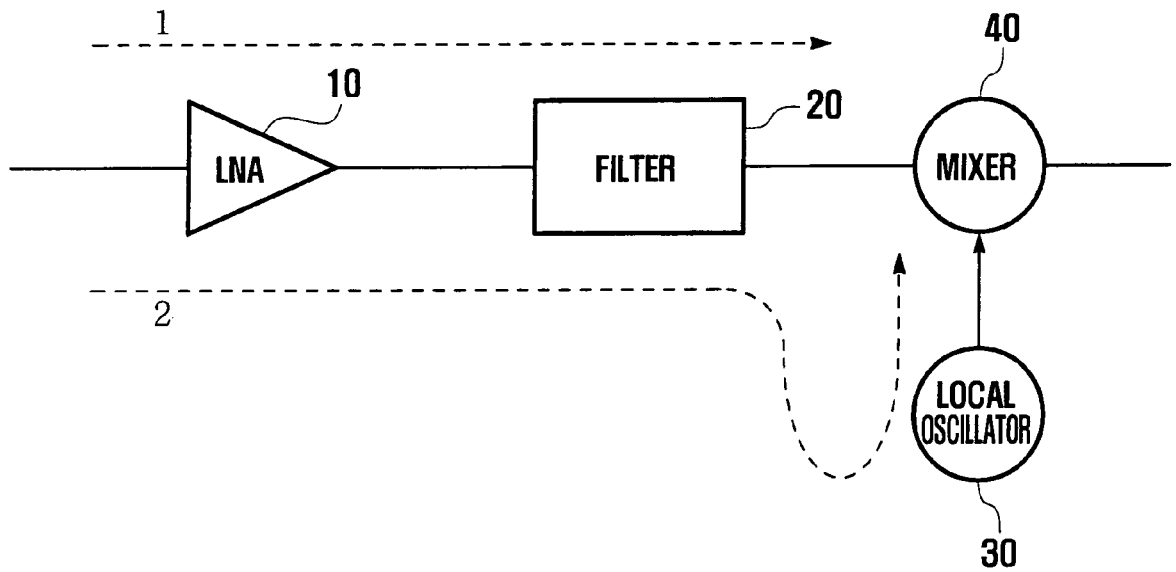
FIG. 1 is a block diagram illustrating a configuration of a conventional DCR.

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Certain terminologies are used in the following description for convenience and reference only and are not limiting. In the following detailed description, only the exemplary embodiments of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature and not restrictive.

In order to understand the present invention, a scenario reflecting a call drop is first explained. It is assumed that two mobile stations share a channel in a multiframe structure of a traffic channel (TCH).

Tables 1a and 1b show the received signal level (rx_level) and the received signal quality (rx_quality) for traffic channels (FNs) of a multiframe.

TABLE 1a

| FN | Normal | | | | FN | Abnormal | | | |
|---|---|---|---|---|---|---|---|---|---|
| 0 | rx_level | −100 | rx_quality | 1 | 0 | rx_level | −87 | rx_quality | 7 |
| 1 | rx_level | −96 | rx_quality | 1 | 1 | rx_level | −88 | rx_quality | 7 |
| 2 | rx_level | −99 | rx_quality | 0 | 2 | rx_level | −87 | rx_quality | 7 |
| 3 | rx_level | −108 | rx_quality | 4 | 3 | rx_level | −88 | rx_quality | 7 |
| 4 | rx_level | −100 | rx_quality | 0 | 4 | rx_level | −87 | rx_quality | 7 |
| 5 | rx_level | −110 | rx_quality | 5 | 5 | rx_level | −88 | rx_quality | 7 |
| 6 | rx_level | −103 | rx_quality | 0 | 6 | rx_level | −88 | rx_quality | 7 |
| 7 | rx_level | −103 | rx_quality | 1 | 7 | rx_level | −87 | rx_quality | 7 |
| 8 | rx_level | −100 | rx_quality | 1 | 8 | rx_level | −88 | rx_quality | 7 |
| 9 | rx_level | −101 | rx_quality | 0 | 9 | rx_level | −88 | rx_quality | 7 |
| 10 | rx_level | −104 | rx_quality | 3 | 10 | rx_level | −88 | rx_quality | 7 |
| 11 | rx_level | −106 | rx_quality | 3 | 11 | rx_level | −88 | rx_quality | 7 |
| 12 | | | | | 12 | | | | |
| 13 | rx_level | −106 | rx_quality | 3 | 13 | rx_level | −88 | rx_quality | 7 |
| 14 | rx_level | −107 | rx_quality | 3 | 14 | rx_level | −88 | rx_quality | 7 |
| 15 | rx_level | −109 | rx_quality | 5 | 15 | rx_level | −87 | rx_quality | 6 |
| 16 | rx_level | −108 | rx_quality | 4 | 16 | rx_level | −88 | rx_quality | 7 |
| 17 | rx_level | −102 | rx_quality | 2 | 17 | rx_level | −88 | rx_quality | 7 |
| 18 | rx_level | −108 | rx_quality | 3 | 18 | rx_level | −86 | rx_quality | 7 |
| 19 | rx_level | −109 | rx_quality | 5 | 19 | rx_level | −86 | rx_quality | 7 |
| 20 | rx_level | −101 | rx_quality | 0 | 20 | rx_level | −87 | rx_quality | 7 |
| 21 | rx_level | −109 | rx_quality | 5 | 21 | rx_level | −86 | rx_quality | 7 |
| 22 | rx_level | −105 | rx_quality | 1 | 22 | rx_level | −87 | rx_quality | 7 |
| 23 | rx_level | −104 | rx_quality | 2 | 23 | rx_level | −86 | rx_quality | 7 |
| 24 | rx_level | −107 | rx_quality | 4 | 24 | rx_level | −87 | rx_quality | 7 |
| | rx_level | −112 | rx_quality | 6 | 25 | rx_level | −107 | rx_quality | |

TABLE 1b

| FN | Normal | | | FN | Abnormal | | |
|---|---|---|---|---|---|---|---|
| 26 | rx_level | −112 | rx_quality 6 | 26 | rx_level | −88 | rx_quality 7 |
| 27 | rx_level | −113 | rx_quality 4 | 27 | rx_level | −88 | rx_quality 5 |
| 28 | rx_level | −112 | rx_quality 7 | 28 | rx_level | −87 | rx_quality 4 |
| 29 | rx_level | −111 | rx_quality 7 | 29 | rx_level | −86 | rx_quality 7 |
| 30 | rx_level | −111 | rx_quality 6 | 30 | rx_level | −87 | rx_quality 7 |
| 31 | rx_level | −112 | rx_quality 7 | 31 | rx_level | −87 | rx_quality 7 |
| 32 | rx_level | −112 | rx_quality 7 | 32 | rx_level | −87 | rx_quality 7 |
| 33 | rx_level | −101 | rx_quality 0 | 33 | rx_level | −88 | rx_quality 7 |
| 34 | rx_level | −104 | rx_quality 1 | 34 | rx_level | −88 | rx_quality 7 |
| 35 | rx_level | −108 | rx_quality 4 | 35 | rx_level | −87 | rx_quality 7 |
| 36 | rx_level | −106 | rx_quality 2 | 36 | rx_level | −87 | rx_quality 7 |
| 37 | rx_level | −114 | rx_quality 5 | 37 | rx_level | −88 | rx_quality 7 |
| 38 | | | | 38 | | | |
| 39 | rx_level | −111 | rx_quality 7 | 39 | rx_level | −88 | rx_quality 6 |
| 40 | rx_level | −112 | rx_quality 6 | 40 | rx_level | −88 | rx_quality 7 |
| 41 | rx_level | −113 | rx_quality 6 | 41 | rx_level | −88 | rx_quality 7 |
| 42 | rx_level | −112 | rx_quality 6 | 42 | rx_level | −87 | rx_quality 7 |
| 43 | rx_level | −113 | rx_quality 6 | 43 | rx_level | −86 | rx_quality 7 |
| 44 | rx_level | −113 | rx_quality 6 | 44 | rx_level | −88 | rx_quality 7 |
| 45 | rx_level | −112 | rx_quality 7 | 45 | rx_level | −88 | rx_quality 7 |
| 46 | rx_level | −107 | rx_quality 3 | 46 | rx_level | −88 | rx_quality 6 |
| 47 | rx_level | −112 | rx_quality 6 | 47 | rx_level | −88 | rx_quality 6 |
| 48 | rx_level | −112 | rx_quality 7 | 48 | rx_level | −86 | rx_quality 3 |
| 49 | rx_level | −112 | rx_quality 5 | 49 | rx_level | −86 | rx_quality 6 |
| 50 | rx_level | −113 | rx_quality 6 | 50 | rx_level | −87 | rx_quality 7 |
| 51 | rx_level | −109 | rx_quality 7 | 51 | rx_level | −106 | rx_quality |

Referring to tables 1a and 1b, the shaded row indicate an idle frame, i.e. $25^{th}$ frame in table 1a and 51th frame in table 1b. Since another mobile station do not transmit in the $25^{th}$ frame and 51th frame, the received signal levels are normal. However, in other frames, the received signal levels are considerably high due to interferences by transmission signals from neighbor mobile stations (for example, −88 dBm in $26^{th}$ frame).

If the received signal level is abnormally high, a mobile station transmits a measurement report message containing an incorrect received signal level value to the network. Accordingly, the network recognizes that the mobile station is in a strong electric field area of the servicing cell even when the mobile station is in a weak electric field area, resulting in no transmission of a handover command. In the worst case, the mobile station loses a handover timing to experience a call drop.

Especially when the mobile station locates in a weak electric field area, the "Tx spurious in Rx band" effect is likely to occur such that the mobile station depends on the operation of the serving cell even when the electric field of the neighbor cell is weak too, thus resulting in a call drop.

As described above, when two or more mobile stations share a frame for communication with a base station, neighbor mobile stations cause interference. In order to solve this problem, various transmit spurious elimination methods have been developed. Among them, hardware-based transmit spurious elimination methods are proposed. However, the hardware-based transmit spurious elimination method are disadvantageous in additional hardware cost and have limits on performance due to the RF characteristic.

In the present invention, the mobile station calculates the received signal level of an idle frame and average of the received signal levels of the rest frames during a predetermined period in a multiframe, and compares the average received signal levels. If the average received signal level is greater than a threshold value, the mobile station regards that the "Tx spurious in Rx band" is detected. Hence, in the present invention, a Tx spurious detected in Rx band is used for compensating a received signal level (rx_lev) value of a measurement report message.

If the "Tx spurious in Rx band" is detected, the mobile station uses the received signal levels and received signal qualities, and the average received signal level and received signal quality of the frames for generating a measurement report message.

For example, if the "Tx spurious in Rx band" is detected, the mobile station applies a predetermined offset to an abnormal received signal level on the basis of the received signal levels and received signal qualities measured in the predetermined period, and transmits a measurement report message along with the received signal level compensated with the offset. Accordingly, the network decides a handover of the mobile station on the basis of the compensated received signal level. Thus it is possible to prevent the mobile station from a call drop caused by incorrect measure information.

In the present invention, a current received signal level is compensated by adding an offset determined on the basis of the previously measured received signal level and received signal quality, whereby the mobile station can transmit a measurement report message having a value of the received signal level in the range of normal received signal level that are expected in the normal state. Accordingly, the network increases a transmission frequency of the handover command, resulting in reduction of a call drop of the mobile station.

Figure 2:
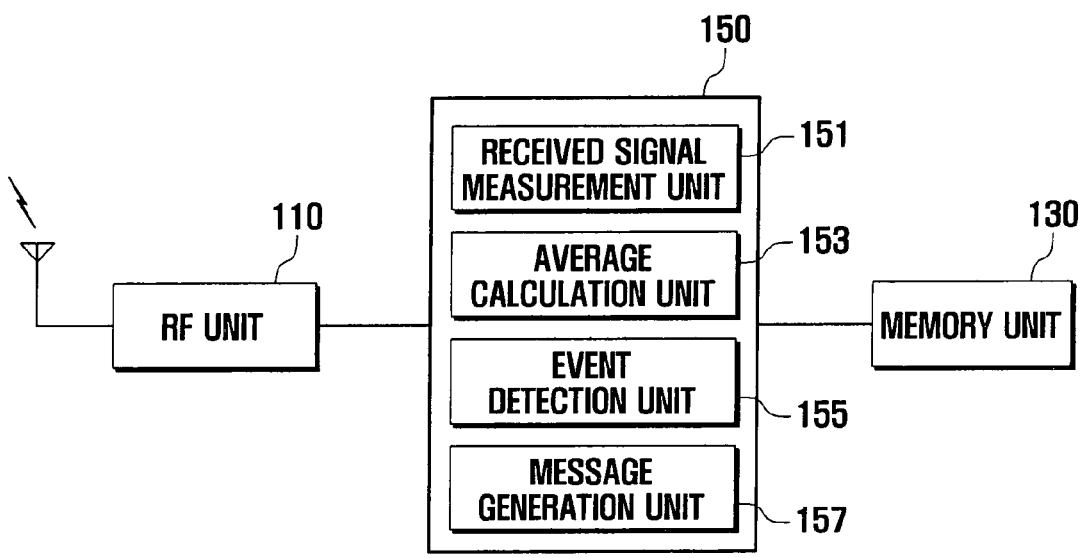
FIG. 2 is a block diagram illustrating a configuration of a mobile station according to an exemplary embodiment of the present invention.

FIG. 2 is a block diagram illustrating a configuration of a mobile station according to an exemplary embodiment of the present invention.

In this embodiment, the mobile station detects a "Tx spurious in Rx band" and compensates a received signal level value of a measurement report message when the "Tx spurious in Rx band" is detected.

Referring to FIG. 2, the mobile station includes a radio frequency (RF) unit 110, a memory unit 130, and a control unit 150. The control unit 150 includes a received signal measurement unit 151, an average calculation unit 153, an event detection unit 155, and a message generation unit 157.

The RF unit 110 is responsible for establishing a radio communication channel with a mobile communication network for exchanging voice and data. The RF unit 110 includes an RF transmitter for up-converting and amplifying a baseband signal to be transmitted and an RF receiver for low noise amplifying and down-converting a received radio frequency signal.

The memory unit 130 stores an operating system, application programs for executing supplementary functions, and user data received through the communication network and input by the user. The memory unit 130 can includes at least one buffer for buffering application data generated while the application programs operate. Particularly, the memory unit 130 stores measured channel information in the multiframe (for example, received signal levels and received signal qualities), an offset value obtained from the measured channel information, and threshold values for determining the channel status. The measured channel information is stored in the form of a database as tables 1a and 1b.

The control unit 150 controls general operations of the mobile station and cooperative signaling between the units constituting the mobile station. The control unit 150 can be implemented with a modem and a codec. The codec includes a data codec for processing packet data and an audio codec for processing the voice and other audio signals.

Particularly, the control unit 150 calculates the received signal level of the idle frame and the received signal levels of the rest frames in the multiframe, and stores the calculation result as the measurement information in the memory unit 130. The control unit 150 determines the offset and threshold values on the basis of the measurement information.

The control unit 150 compensates the received signal level of the mobile station on the basis of the offset and threshold values, and transmits the compensated received signal level to the network via the measurement report message. For this purpose, the control unit 150 includes the received signal measurement unit 151, average calculation unit 153, event detection unit 155, and message generation unit 157.

The received signal measurement unit 151 measures the received signal level and received signal quality of the multiframe through the RF unit 110 during a predetermined period under the control of the control unit 150, such that the control unit 150 stores the received signal level and received signal quality in the memory unit 130. The received signal measurement unit 151 also measures the received signal level and received signal quality periodically or at a time point when a specific event (for example, a signal transmission or a signal reception) in the multiframe, such that the control unit 150 compares the current received signal level and received signal quality with the previous received signal level and received signal quality measured during the preset time duration, respectively, and determines the occurrence of the "Tx spurious in Rx band" on the basis of the comparison result.

The average calculation unit 153 calculates an average of the received signal levels of the frames except for the idle frame in a multiframe.

The event detection unit 155 analyzes the average received signal level of the non-idle frames and the received signal level of the idle frame, and determines the occurrence of the "Tx spurious in Rx band" on the basis of the analysis result. That is, the event detection unit 155 determines the received signal level and the received signal quality of the currently received signal through the RF unit 110 using the received signal level and received signal quality of the idle frame measured during a specific duration and the average received signal level and received signal quality of the non-idle frames.

The message generation unit 155 performs a received signal level compensation by applying the offset value on the basis of the determination result of the event detection unit 155 so as to generate a measurement report message containing the compensated received signal level value.

In FIG. 2, the mobile station is depicted with the internal blocks in only consideration of the received signal level compensation procedure; however, the present invention is not limited thereto. Thus, it should be noted that the mobile station can include at least one of a data processing unit, an audio processing unit, a keypad unit, a display unit, a camera module, and a digital broadcast receiver module.

Operation of the above-structure mobile station is described hereinafter with reference to FIG. 3.

The present invention relates to a mobile communication system and, in particular, to an apparatus and method for compensating a received signal level (RXLEV), which is contained in a measurement report message distorted, distorted by "Transmit spurious in Receive band".

Figure 3:
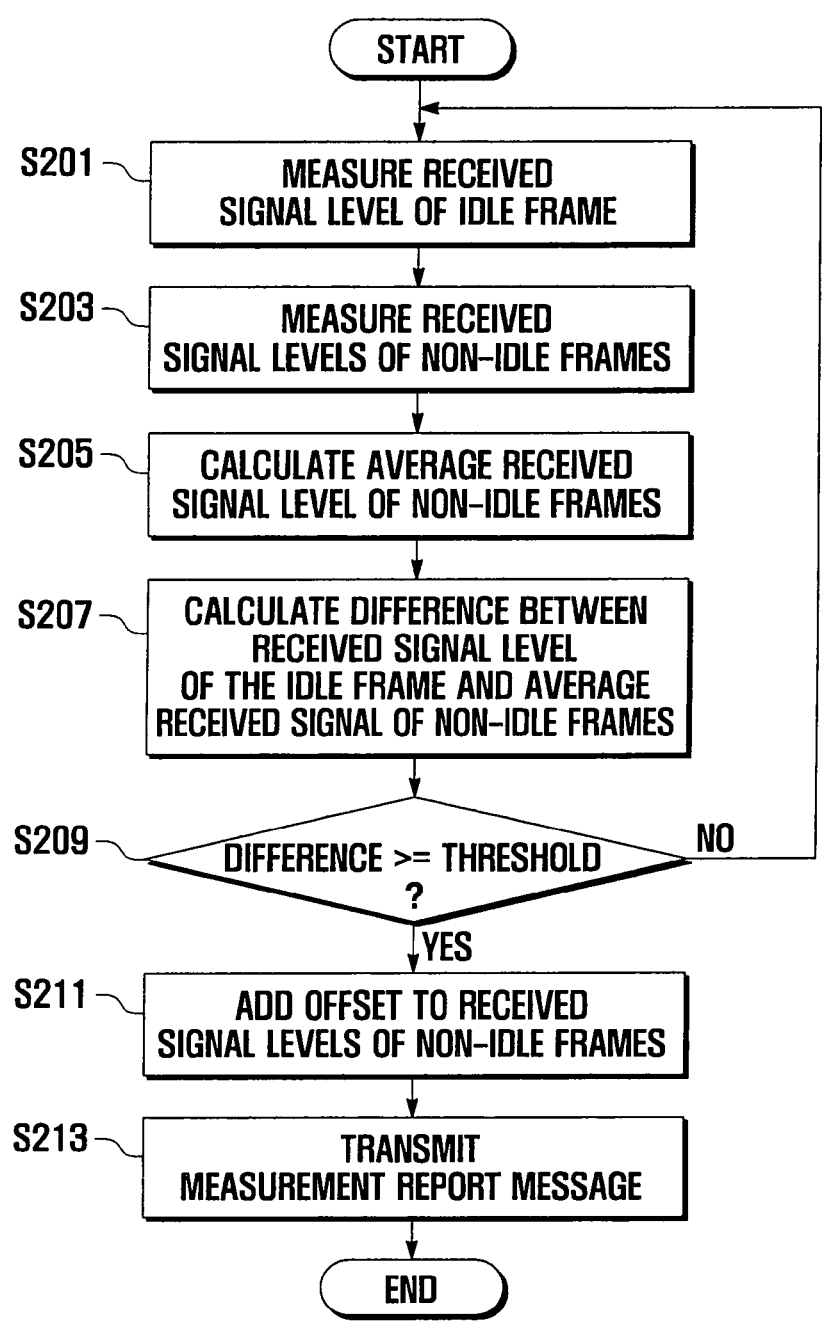
FIG. 3 is flowchart illustrating a received signal level compensation method according to an exemplary embodiment of the present invention.

Referring to FIG. 3, the mobile station measures a received signal level of an idle frame (S201) and then measures the received signal levels of respective non-idle frames (S203). Next, the mobile station calculates an average received signal levels of the non-idle frames (S205). Through steps S201 to S205, the mobile station measures the received signal levels and received signal qualities of multiframes during a predetermined period (for example, 26*N frames, N is a positive integer). That is, the mobile station measures the received signal level of the idle frame and the received signal levels of the non-idle frames, and calculates the average received signal level of the non-idle frames.

After the received signal level of the idle frame and the average received signal level of the non-idle frames are obtained, the mobile station calculates the difference between the received signal level of the idle frame and the average received signal level of the non-idle frames (S207). Next, the mobile station determines the difference between the received signal level of the idle frame and the average received signal level of the non-idle frames is greater than or equal to a predetermined threshold (S209).

The mobile station determines a "Tx spurious in Rx band" occurs if the difference between the received signal of the idle frame and the average received signal level of the non-idle frames is greater than or equal to the threshold. Preferably, the threshold is determined in consideration of hardware characteristics.

If the difference between the received signal of the idle frame and the average received signal level of the non-idle frames is greater than or equal to the threshold, the mobile station adds an offset to the respective received signal levels of the non-idle frames (S211).

That is, if a "Tx spurious in Rx band" occurs, the mobile station determines an offset value on the basis of the received signal levels of the idle and non-idle frames.

For example, assuming that the period consists of 52 frames from FN0 to FN51 of tables 1a and 1b, the received signal level and the received signal quality of the idle frame are RELEV=−106 dBm and RXQUAL=1, and the average received signal level and the average received signal quality of the non-idle frames are RELEV=−87 dBm and RXQUAL=6 dBm. It is noted that the digits following the decimal point are discarded for simplifying the explanation.

In the above example, it is shown that the received signal quality of the idle frame is greater than the average received signal quality of the non-idle frames, while the received signal level of the idle frame is less than the average received signal level of the non-idle frames.

Accordingly, the mobile station detects an occurrence of "TX spurious in Rx band," thereby determining an offset value on the basis of the difference between the received signal level of the idle frame and the average received signal level of the non-idle frames and adding the offset value to the respective received signal levels of the non-idle frames.

Next, the mobile station generates a measurement report message along with the compensated received signal levels and then transmits the measurement report message to the network (S213).

The received signal levels of the non-idle frames can be compensated so as to be identical to the received signal level of the idle frame or in such a manner that the difference between the received signal levels of the non-idle frames and the idle frame decreases by gradually changing the value of the offset. The compensated received signal level can be restricted so as not to become less than the received signal level of the idle frame.

The received signal levels of the non-idle frames also can be compensated in consideration of the received signal qualities as following examples.

In a case of the original RXLEV is less than or equal to −80 dBm and RXQUAL is less than or equal to 3, a transmit RXLEV=RXLEV−30=−110 dBm.

In a case of the original RXLEV is less than or equal to −85 dBm and RXQUAL is less than or equal to 4, a transmit RXLEV=RXLEV−25=−110 dBm.

In a case of the original RXLEV is less than or equal to −90 dBm and RXQUAL is less than or equal to 5, a transmit RXLEV=REXLEV−20=−110 dBm.

In a case of the original RXLEV is less than or equal to −95 dBm and RXQUAL is less than or equal to 6, a transmit RXLEV=RXLEV−15=−110 dBM.

Preferably, the offset values corresponding to the values of received signal quality are stored in the form of a table to refer to when the "Tx spurious in Rx band" occurs.

In accordance with this embodiment of the present invention, the network can decide a handover more accurately on the basis of the compensated received signal level contained in the measure report message, whereby the handover decision is made reliably and the call drop rate is reduced.

As described above, in the received signal level compensation apparatus and method of the present invention, the mobile station measures the received signal level of the idle frame and the average received signal level of the non-idle frames in a multiframe, and determines the occurrence of "Tx spurious in Rx band" on the basis of comparison between the difference of the received signal level of the idle frame and the average received signal levels of the non-idle frames and a predetermined threshold. If the "Tx spurious in Rx band" occurs, the mobile station compensates the received signal levels of the non-idle frames and transmits a measurement report message contained the compensated received signal levels of the non-idle frames, resulting in a reliable transmit power control and handover management.

In addition, the received signal level compensation apparatus and method for a mobile station are advantageous in that a handover decision of a mobile station is made on the basis of an accurate received signal level and received signal quality compensated by the mobile station. Moreover, the received signal level compensation apparatus and method for a mobile station compensate a received signal level when a "Tx spurious in Rx band" is detected, and transmits the compensated received signal level to a network through a measurement report message, resulting in protection of call drop caused by an inaccurate measurement report. Furthermore, the received signal level compensation apparatus and method for a mobile station provides a network with accurate channel information such that the network can control transmit power and handover more effectively, resulting in enhancement of network performance.

Although exemplary embodiments of the present invention are described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A received signal level compensation method of a mobile station in a mobile communication system having the mobile station and a network, comprising:
   measuring a received signal level of signals received in the form of a multiframe from the network;
   comparing the received signal level with a predetermined threshold;
   compensating, if the received signal level is greater than the threshold, the received signal level by adding a predetermined offset to the received signal level; and
   transmitting the compensated received signal level to the network.

2. The method of claim 1, further comprises:
   collecting information on the multiframe during a predetermined period; and
   determining the predetermined offset and the predetermined threshold of the received signal level on the basis of the collected information on the multiframe.

3. The method of claim 2, wherein the information on the multiframe comprises a received signal level and a received signal quality of the multiframe.

4. A received signal level compensation method of a mobile station using a multiframe including a plurality of frames, comprises:
   measuring a received signal level of signals received in the form of a multiframe from a network;
   calculating a received signal level of an idle frame and an average received signal level of non-idle frames in the multiframe;
   calculating the difference between the received signal level of the idle frame and the average received signal level of the non-idle frames;
   comparing the difference with a predetermined threshold;
   compensating, if the difference is eater than the threshold, the received signal level of the frame by adding a predetermined offset to the received signal level; and
   generating a measurement report message containing the compensated received signal level to be transmitted to the network.

5. The method of claim 4, wherein measuring a received signal level comprises:
   measuring the received signal level of the idle frame of the multiframe associated with a serving cell; and
   measuring the received signal levels of the non-idle frames of the multi frame associated with the serving cell.

6. The method of claim 4, wherein the offset is calculated on the basis of the received signal levels and a received signal qualities measured during a predetermined period.

7. The method of claim 4, wherein the received signal level is compensated to be identical to the received signal level of the idle frame.

8. The method of claim 4, wherein the received signal level is compensated such that the difference decreases by gradually changing the value of the offset.

9. A received signal level compensation apparatus of a mobile station, comprising:
 a radio frequency unit for receiving signals in the form of a multiframe from a network;
 a control unit for measuring a received signal level of the received signals of the multiframe, comparing the received signal level with a predetermined threshold, compensating, if the received signal level is greater than the threshold, the received signal level by adding a predetermined offset to the received signal level, and transmitting the compensated, received signal level to the network; and
 a memory unit for storing the received signals and the threshold and offset of the received signal level.

10. The apparatus of claim 9, wherein the control unit comprises:
 a received signal measurement unit for measuring a received signal level and a received signal quality of a multiframe of a traffic channel received through the radio frequency unit;
 an average calculation unit for calculating an average received signal level of non-idle frames of the multiframe:
 an event detection unit for comparing a received signal level of an idle frame and an average received signal level of the non-idle frames; and
 a message generation unit for generating a measurement report message with the received signal level compensated with an offset.

11. The apparatus of claim 10, wherein the event detection unit calculates the difference between the received signal level of the idle frame and an average received signal levels of the non-idle frames, and determines whether the difference is greater than a threshold value.

12. The apparatus of claim 9, wherein the control unit determines the offset and threshold on the basis of the received signals, if the received signal level in a frame is greater than the threshold, compensates the received signal level of the frame in which the error occurs, and generating a measurement report message with the compensated received signal level.

13. The apparatus of claim 9, wherein the threshold and offset of the received signal level is determined on the basis of the received signals.

* * * * *

UNITED STATES PATENT AND TRADEMARK OFFICE
CERTIFICATE OF CORRECTION

| | | |
|---|---|---|
| PATENT NO. | : 7,903,612 B2 | Page 1 of 1 |
| APPLICATION NO. | : 11/900280 | |
| DATED | : March 8, 2011 | |
| INVENTOR(S) | : Yun Seo Choi et al. | |

It is certified that error appears in the above-identified patent and that said Letters Patent is hereby corrected as shown below:

Column 10, Claim 4, Line 50 should read as follows:
--..the difference is GREATER than...--

Signed and Sealed this
Thirteenth Day of September, 2011

David J. Kappos
*Director of the United States Patent and Trademark Office*